United States Patent
Durvasula et al.

(10) Patent No.: US 12,530,831 B2
(45) Date of Patent: Jan. 20, 2026

(54) RECOMMENDATION SYSTEMS FOR GENERATING VIRTUAL ENVIRONMENTS BASED ON PERSONALIZED RECOMMENDATIONS

(71) Applicant: Teachers Insurance and Annuity Association of America, New York, NY (US)

(72) Inventors: Sastry VSM Durvasula, Phoenix, AZ (US); Rares Ioan Almasan, Paradise Valley, AZ (US); Swatee Singh, Livingston, NJ (US); Upendra Sharadchandra Mardikar, Fremont, CA (US); Vamsi Pola, Concord, NC (US)

(73) Assignee: Teachers Insurance and Annuity Association of America, New York, NY (US)

( * ) Notice: Subject to any disclaimer, the term of this patent is extended or adjusted under 35 U.S.C. 154(b) by 250 days.

(21) Appl. No.: 18/243,716

(22) Filed: Sep. 8, 2023

(65) Prior Publication Data

US 2025/0086870 A1 Mar. 13, 2025

(51) Int. Cl.
*G06T 13/40* (2011.01)
*G06N 20/00* (2019.01)
*G06T 19/00* (2011.01)

(52) U.S. Cl.
CPC .............. *G06T 13/40* (2013.01); *G06N 20/00* (2019.01); *G06T 19/006* (2013.01)

(58) Field of Classification Search
CPC ....... G06T 13/40; G06T 19/006; G06T 11/60; G06T 19/20; G06N 20/00; G06N 3/08; G06N 3/045; G06Q 10/0637; G06Q 50/01; G06Q 30/0269; G06F 16/285; G06F 3/0484; G06F 40/40; G06F 3/011; G06F 16/9035; G09B 5/02; G09B 7/02
See application file for complete search history.

(56) References Cited

U.S. PATENT DOCUMENTS

| | | | | |
|---|---|---|---|---|
| 2023/0410159 A1* | 12/2023 | Zavesky | ............ | G06Q 30/0201 |
| 2024/0323497 A1* | 9/2024 | Dasher | ............. | H04N 21/47217 |
| 2024/0354555 A1* | 10/2024 | Knipfing | .............. | G06N 3/0455 |

* cited by examiner

*Primary Examiner* — Xilin Guo
(74) *Attorney, Agent, or Firm* — Lowenstein Sandler LLP

(57) ABSTRACT

A system includes a memory, and a processing device, operatively coupled to the memory, to perform operations including obtaining user data associated with a user, generating, using at least one machine learning (ML) model processing the user data, a virtual environment associated with an extended reality (XR) representation corresponding to a personalized recommendation for the user, and creating, based on the user data, a virtual avatar for the user reflecting a representation of the user within the virtual environment. The virtual avatar corresponds to a set of attributes representing visual features of the user.

20 Claims, 7 Drawing Sheets

RECOMMENDATION SYSTEMS FOR GENERATING VIRTUAL ENVIRONMENTS BASED ON PERSONALIZED RECOMMENDATIONS

TECHNICAL FIELD

Implementations of the disclosure relate generally to database management, and more specifically, relate to recommendation systems for generating virtual environments based on personalized recommendations.

BACKGROUND

An enterprise environment can include multiple devices communicably coupled by a private network owned and/or controlled by an enterprise (e.g., organization). An enterprise environment can include an on-premises subnetwork in which software is installed and executed on computers on the premises of the enterprise using the software.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1A:
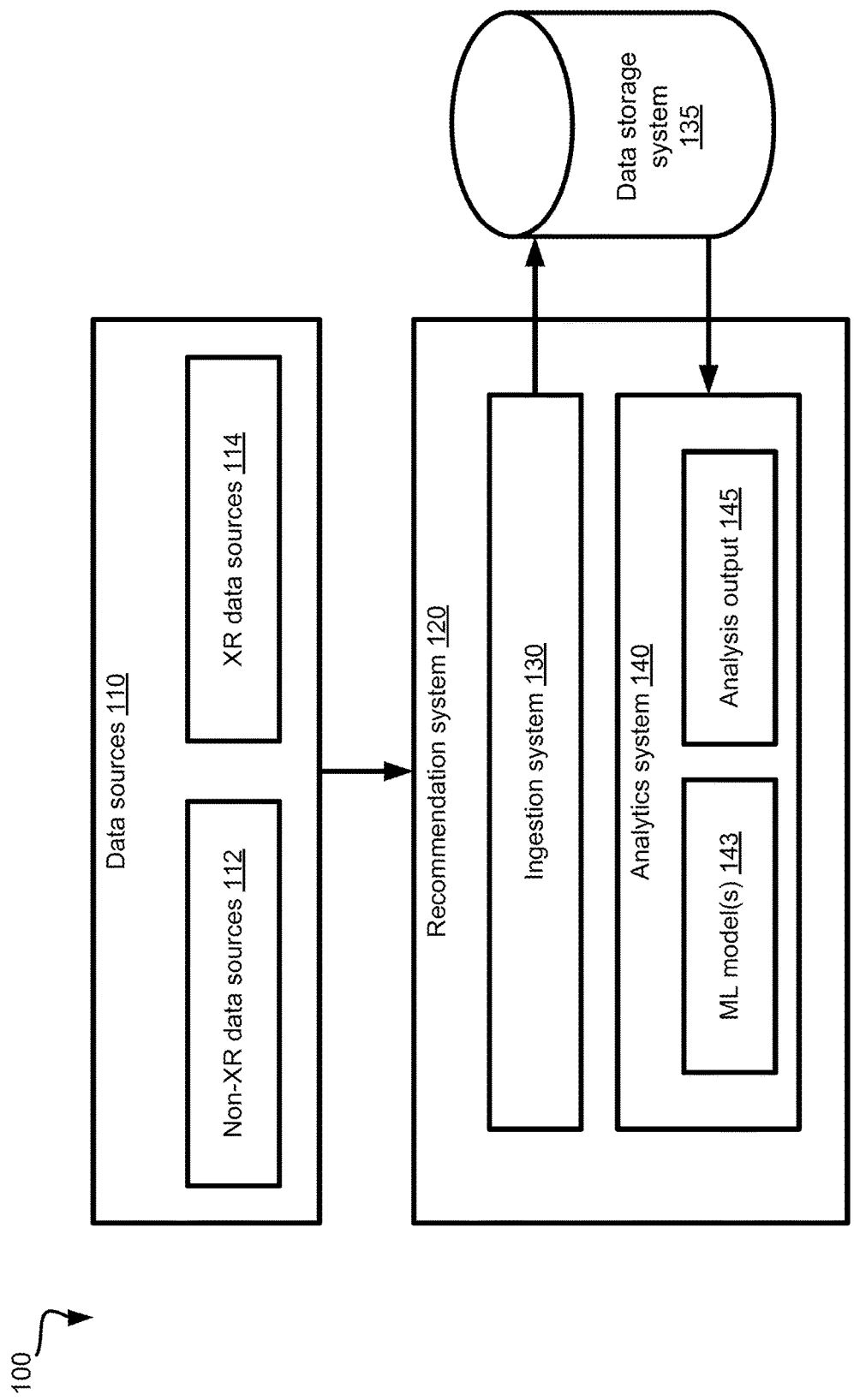
FIGS. 1A-2 are diagrams of example computer systems to implement recommendation systems for generating virtual environments based on personalized recommendations, in accordance with some implementations of the present disclosure.

Aspects of the present disclosure are directed to recommendation systems for generating virtual environments based on personalized recommendations. A computing system can include multiple devices communicatively coupled via a network. The network can include one or more of: a local area network (LAN) to connect devices within a limited region (e.g., a building), a wide area network (WAN) to connect devices across multiple regions (e.g., using multiple LANs), etc. For example, a computing system can be an enterprise environment overseen by an enterprise (e.g., organization). An enterprise environment can include multiple devices communicably coupled by a private network owned and/or controlled by an enterprise (e.g., organization). An enterprise environment can include an on-premises subnetwork in which software is installed and executed on computers on the premises of the enterprise using the software. Additionally or alternatively, an enterprise environment can include a remote subnetwork (e.g., cloud subnetwork) in which software is installed and executed on remote devices (e.g., server farm). An enterprise environment can be used to facilitate access to data and/or data analytics among devices of the private network. Examples of devices of an enterprise environment can include client devices (e.g., user workstations), servers (e.g., web servers, email servers, high performance computing (HPC) servers, database servers and/or virtual private network (VPN) servers), etc. An enterprise can oversee a computing system that utilizes a variety of technology services in order to provide their solutions and capabilities to users and clients. Examples of technology services include services that can implement and/or host technology services internally within a datacenter or other computing system (i.e., on-premises infrastructure). Additionally or alternatively, enterprise can use remote services providers (e.g., cloud service providers) that implement and host technology services using remote infrastructure (e.g., remote servers). Examples of technology services include software as a service (SaaS), infrastructure as a service (IaaS), platform as a service (PaaS), etc. For example, enterprises can use third party vendors and/or suppliers to provide technology services. Enterprises may also own or partially own subsidiaries or affiliates who provide technology services.

One example of a technology service that can be provided by a computing system, which can be managed by an enterprise, is a recommendation service enabled by a recommendation system including at least one processing device. A recommendation system can utilize at least one machine learning (ML) model to generate a personalized recommendation for a user. A personalized recommendation is a recommendation that is determined by analyzing input data defining a set of attributes of a user. A set of attributes of a user can include user likes, user dislikes, user activity, demographic information, financial information, etc.

Some recommendation systems utilize rule-based and/or algorithmic models to make personalized recommendations. While such rule-based and/or algorithmic models can be used to generate personalized recommendations, they rely heavily on historical data. Accordingly, it may be difficult or impossible to use rule-based and/or algorithmic models to generate recommendations that are tailored to address user-specific criteria or changes in trends. Additionally, some personalized plans are rigid and focused mainly on users as individuals, while neglecting the impact that other individuals who interact with the users have on such personalized plans, such as family, friends, communities, etc. Moreover, individuals may be incapable of taking a wide range of factors into account. In fact, it may be virtually impossible for individuals to predict how various factors can impact future decisions, such as externalities like climate change, natural disasters, political unrest, etc. It also may be difficult for a user to visualize the future offered by a personalized plan generated by a recommendation system for the user. Some recommendation systems, particularly those that generate personalized recommendations based on future predictions such as retirement plans, fail to provide a tangible, interactive and/or immersive experience for users. This can make it difficult for a user to properly envision the personalized recommendation, which can impact the ability of the user to fully appreciate the impact that the personalized recommendation may have on the user. Reliance on web-based views and/or mobile-based views can also limit the ability of the user to fully understand plan options and can lead to unsatisfying outcomes.

Aspects of the present disclosure address the above and other deficiencies by implementing recommendation systems for generating virtual environments based on personalized recommendations. A recommendation system described herein can generate a personalized recommendation for a user using data collected from various data sources. In some implementations, a personalized recommendation generated for a user is a personalized plan for the user related to achieving a goal or target. For example, a personalized plan for a user provided by the recommendation system can be a plan related to the user's future. Illustratively, the personalized plan can be a personalized retirement plan. Further details regarding personalized recommendations will be described herein below with reference to FIGS. 1A-6.

In some implementations, a data source is a non-XR data source from which non-XR data pertaining to a user can be collected. Examples of non-XR data sources include websites, applications, client devices (e.g., laptops, mobile devices, desktops and/or tablets), Internet of Things (IoT) devices, etc. Examples of non-XR data that can be obtained from non-XR data sources include data obtained from social media channels, data obtained from financial websites, data obtained from electronic mail accounts, data obtained from online surveys, data obtained from travel or vacation websites, health and wellness data, etc.

In some implementations, a data source is an XR data source from which XR data can be collected. An example of an XR data source is an XR system operated by a user. Examples of XR systems described herein include virtual reality (VR) systems, augmented reality (AR) systems and mixed reality (MR) systems. For example, in the case of a VR system, the VR system can provide a user with access to an immersive virtual environment that can include one or more virtual worlds. More specifically, the virtual environment can be a three-dimensional (3D) virtual space accessible to the user, where the user can interact with other users and with digital objects in the 3D virtual space. A virtual avatar can represent the user within the virtual environment. Using the virtual avatar, the user can perform different types of activities, such as explore the virtual environment, socialize with other users who are currently present within the virtual environment, participate in games and activities supported by the virtual world, buy and sell virtual goods within a virtual marketplace supported by the virtual world, etc. A virtual environment can be generated and maintained using a combination of technologies, such as artificial intelligence (AI), blockchain, etc. These technologies can enable the creation and storage of large amounts of data that can be used to populate the virtual worlds with virtual content, such as virtual objects, virtual avatars, virtual buildings, etc. For example, XR data can be collected from virtual interactions by the user in the virtual environment, such as interactions during virtual events, within virtual communities or marketplaces, etc. Accordingly, XR data can be analyzed to identify user preferences, behaviors, social connections, etc. in the virtual world, which can be used to generate a personalized recommendation for the user. Further details regarding XR data, XR data sources and the creation of virtual environments will be described herein below with reference to FIGS. 1A-7.

The recommendation system can generate at least one digital representation of a personalized recommendation made for a user. The digital representation can provide an illustration of aspects of the user's future that is predicted in accordance with the personalized recommendation. Illustratively, for a personalized retirement plan generated for a user, the digital representation can illustrate a future predicted for the user that can result from the user following the personalized retirement plan (e.g., a future house, future vacations, etc.). A user can share the at least one digital representation with others. In some implementations, a digital representation is an XR representation. The recommendation system can make the XR representation accessible to the user via an XR system (e.g., VR system, AR system and/or MR system). In some implementations, a digital representation is a non-XR representation. Examples of non-XR representations include audio representations, visual representations, audiovisual representations and/or textual representations. In some implementations, a digital representation of one type can be converted into a digital representation of another type. In some implementations, the recommendation system receives feedback data to adjust a personalized recommendation for a user (e.g., personalized plan) and/or a digital representation for the user. More specifically, the feedback data can include data indicative of user behavior and/or user preferences. In some implementations, the feedback data is generated from interactions by the user. For example, the feedback data can include XR data generated from interactions by the user within a virtual environment accessible via an XR system. Further details regarding generating digital representations of personalized recommendations are described herein below with reference to FIGS. 1A-7.

Advantages of the present disclosure include, but are not limited to, improved recommendation system performance. For example, implementations described herein can enable the creation of customized and personalized recommendations (e.g., plans) that provide more relevant information to users. As another example, implementations described herein can provide digital representations to users as virtual experiences, which can provide a more immersive and engaging experience that enables users to visualize their personalized plans. As yet another example, implementations described herein can improve recommendations and/or digital representations by taking into account data derived from both non-XR and XR data sources. As yet another example, implementations described herein can continuously learn the behavior of a user from user interactions with respect to both XR and non-XR sources, and can adjust a recommendation and/or digital representation for the user based on behavior and preferences. This can ensure that the recommendation and/or digital representation remains relevant and customized to user preferences, which may evolve over time. As yet another example, by using ML models that can be agnostic to user segments, implementations described herein can be used to generate more objective personalized recommendations for users by eliminating historical biases that may be present in personalized recommendations made by recommendation systems.

FIG. 1A is a diagram illustrating an example computing system ("system") 100 integrating XR to generate personalized recommendations, in accordance with some implementations of the present disclosure. In some implementations, system 100 is managed by an enterprise. System 100 can include set of data sources 110 that provide user data related to at least one user. Examples of user data include health and wellness data, financial data, demographic data, and miscellaneous data. Examples of health and wellness data include activity data, heart rate data, blood pressure data, pulse data, oximeter data, etc. Examples of financial data include spending pattern data, economic indicator data, market trend data, income data, expense data, savings rate data, investment performance data, investment allocation data, retirement plan contribution data, retirement account balance data, entitlement benefit data (e.g., Social Security and/or defined benefit plan), investment return data, healthcare cost data, withdrawal strategy data, tax rate data, housing cost data, etc. Examples of miscellaneous data include travel or vacation data, regulatory data, etc.

More specifically, set of data sources 110 can include set of non-XR data sources 112 that are sources of non-XR data for the user. Examples of non-XR data that can be obtained from non-XR data sources include data obtained from social media channels, data obtained from financial websites, data obtained from electronic mail accounts, data obtained from online surveys, data obtained from travel or vacation websites, health and wellness data, etc. Additionally or alternatively, set of data sources 110 can include set of XR data sources 114 that are sources of XR data for the user. For example, set of XR data sources 140 can include at least one XR system, which can include at least one of: a VR system, an AR system, an MR system, etc. XR data for a user can be obtained through an XR system operated by the user. For example, in the case of a VR system, the VR system can enable access to a virtual environment that can include one or more virtual worlds that provide an immersive virtual experience for users. More specifically, each virtual world can be a 3D virtual space accessible to the user, where the user can interact with other users and with digital objects in the 3D virtual space. The user can create a virtual avatar that represents the user within a virtual world. Once inside a virtual environment, a user can perform various different types of activities, such as explore the virtual environment, socialize with other users who are currently present within the virtual environment, participate in games and activities supported by the virtual environment, buy and sell virtual goods within a virtual marketplace supported by the virtual environment, etc. A virtual environment can be generated and maintained using a combination of technologies, such as AI, blockchain, etc. These technologies can enable the creation and storage of large amounts of data that can be used to populate the virtual worlds with virtual content, such as virtual objects, virtual avatars, virtual buildings, etc. For example, XR data can be collected from virtual interactions by the user in the virtual world, such as interactions during virtual events, within virtual communities or marketplaces, etc. Accordingly, XR data can be used to identify user preferences, behaviors, social connections, etc. in the virtual world. For example, with reference to FIG. 1B, set of non-XR data sources 112 can include at least one of: website 150, application 152, client device 154 (e.g., laptop, mobile device, a desktop and/or a tablet), IoT device 156 (e.g., wearable device), etc., and set of XR data sources 114 can include at least one XR system 158. An example XR system 158 will be described below with reference to FIG. 2.

In some implementations, one or more of data sources 110 utilize a gamification technique to determine user preferences. More specifically, a gamification technique integrates game mechanics or game-like elements, such as points, badges, leaderboards, challenges, rewards, etc., into activities that are not inherently games. Gamification techniques can be used to track and analyze user actions and/or behaviors to identify (e.g., infer) patterns and preferences. Gamification techniques can be used in conjunction with non-XR data sources 112 and/or XR data sources 114.

Referring back to FIG. 1A, system 100 can further include recommendation system 120. Recommendation system 120 can generate a personalized recommendation for a user of system 100 based on user data for the user obtained from set of data sources 110. More specifically, recommendation system 120 can include ingestion system 130 to perform data ingestion. Data ingestion refers to the collection and importation of data from set of data sources 110 for storage into a data storage system (e.g., database), such as data storage system 135. Ingestion system 130 can employ a set of data ingestion tools to perform data ingestion. For example, the set of data ingestion tools can include one or more application programming interfaces (APIs).

Data ingestion can involve a number of stages, which can include extraction, transformation and loading ("ETL"). During the extraction stage, user data identified from a set of data sources pertaining to the user is extracted. The user data may be extracted from various different data sources (e.g., non-XR and/or XR) and/or in various different data formats or types. Examples of data formats include structured data, semi-structured data, or unstructured data. Examples of data types include API feeds, database queries, Portable Document Format (PDF) files, word processing document files, table-structured format files (e.g., comma-separated value (CSV) files), read-only API access to technology assets and data sources such as a public cloud infrastructure, etc.

In some implementations, extracting data from set of data sources 110 includes performing data digitization. Data digitization refers to a process of converting analog information included in a non-digital medium (e.g., physical documents, physical photographs, audio recordings and/or video recordings) into a digital format from which data can be extracted. For example, a digital format can be an electronic document, an image file, an audio file, a video file, etc.

Figure 1B:
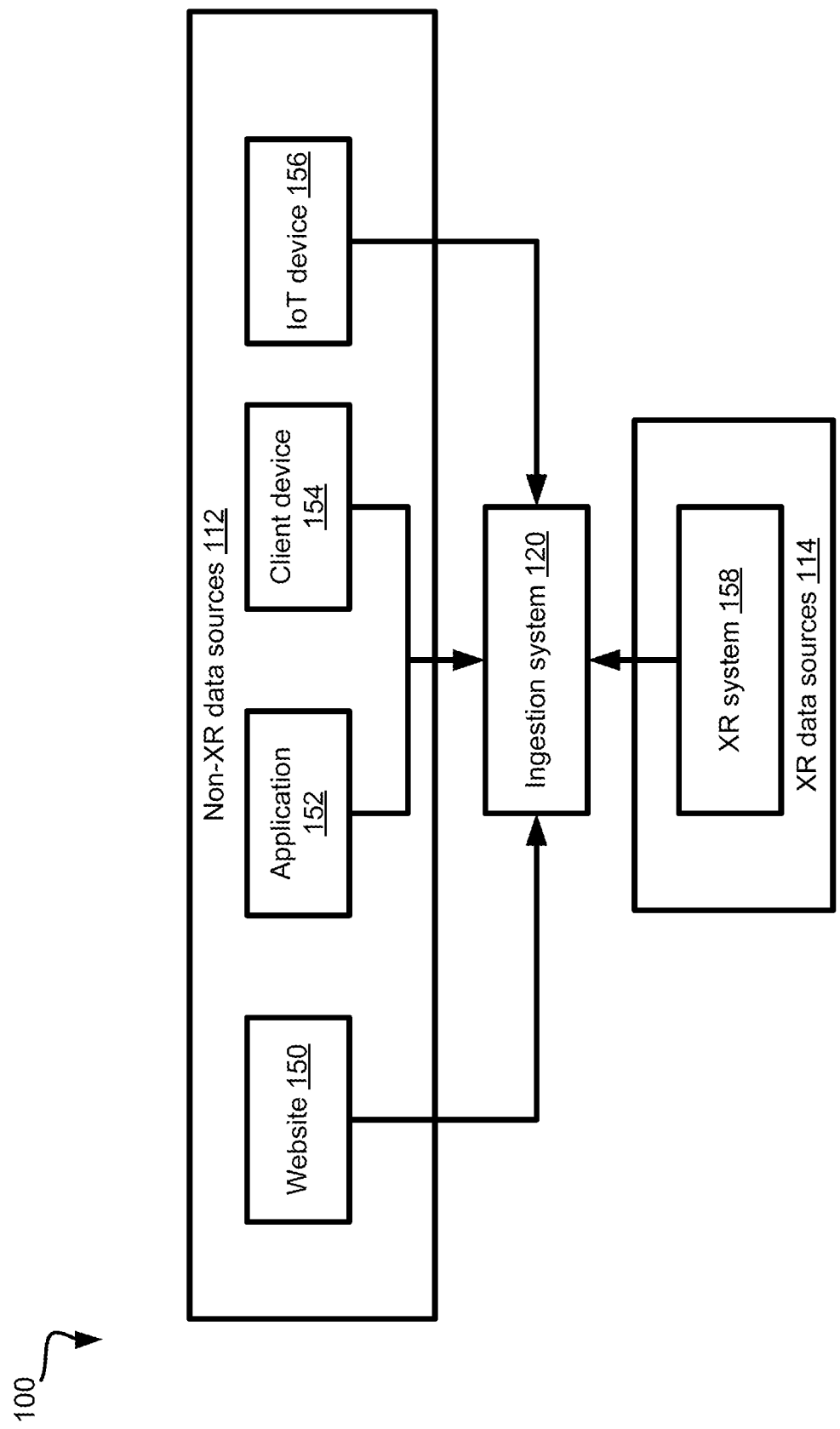

Data can be extracted from website 150 and/or application 152 of FIG. 1B by using a scraping tool (e.g., program or script). A scraping tool can be used to access and extract data from source code. For example, a data can be extracted from website 150 and/or application 152 using an API of website 150 and/or application 152 and/or by using a special purpose tool or programming language.

Data can be extracted from IoT device 156 of FIG. 1B by using a suitable IoT communication protocol. One example of an IoT communication protocol is Message Queuing Telemetry Transport (MQTT). MQTT is a messaging protocol that can be used to transmit messages from IoT device 156 to an external computing device (e.g., recommendation system 120) (and vice versa). MQTT operates using a publish/subscribe model, in which messages are published to a topic, and any device that has subscribed to that topic will receive the message. Another example of an IoT communication protocol is Constrained Application Protocol (CoAP). CoAP is a messaging protocol designed for use with constrained IoT devices, which are IoT devices that are capable of operating under resource constraints (e.g., processing, memory, energy and/or network). Constrained IoT devices can be configured to perform specific tasks with minimal resource consumption. For example a constrained IoT device can be a small, embedded device (e.g., a sensor and/or actuator), which can be used in industries such as smart appliances, wearable technology, and industrial automation. CoAP operates using a client/server model, in which a client can send a request to a server, and the server will send a response back. MQTT can also be used with constrained IoT devices. Both MQTT and CoAP can be used to enable communication between IoT device 156 and recommendation system 120 in environments with limited bandwidth and limited network connectivity (e.g., unreliable network connections).

During the transformation stage, the extracted data is transformed to generate transformed data. The transformed data has a data format suitable for use by the recommendation system to generate a personalized recommendation for a user. For example, the transformed data can have a format suitable for use by an ML model trained to generate a personalized recommendation for a user based on the transformed data. Transforming data can include performing data curation, data integration, data cleaning, data duplication, data de-duplication, data validation, data normalization and/or or data enrichment. In some implementations, transforming the extracted data includes generating an ML model using the extracted data. For example, generating the ML model can include training an ML model based on the extracted data, or updating an ML model (e.g., retraining a previously trained ML model) based on the extracted data. Further details regarding ML models will be described herein below.

In some implementations, transforming the extracted data includes performing data codification. Data codification refers to a process of assigning codes (e.g., symbols) to data that represent respective data attributes, which can be used to organize (e.g., categorize) the data and/or transform the data for further analysis. Codes can be numerical, alphabetical and/or alphanumerical. Mappings between codes and the respective data attributes that they represent can be maintained within a codebook.

In some implementations, transforming the extracted data includes performing natural language processing (NLP). NLP refers to techniques that can enable computers to understand and/or generate human-interpretable language. Performing NLP can include transforming raw text data into processed text data having a data format suitable for analysis, identifying meaning and intent from the processed text data (i.e., language understanding), generating natural language text from non-language data, such as data from sensors, databases, etc. Text preprocessing can include at least one of tokenization, part-of-speech tagging, named entity recognition, etc. Language understanding can include at least one of parsing, sentiment analysis, semantic reasoning, topic modeling, text classification, etc. Language generation can include at least one of text summarization, machine translation, etc.

During the loading stage, the transformed data is loaded into data storage system 135 (e.g., database). Data storage system 135 can be on-premises storage, remote storage (e.g., cloud storage), etc. For example, loading transformed data can include performing batch processing or real-time streaming. Batch processing is a type of data processing in which data is collected, processed, and analyzed in batches, typically at scheduled intervals. In the context of data ingestion, batch processing can include temporarily storing transformed data in a buffer or staging area, and then processing the transformed data in batches at predetermined times. In contrast to batch processing, real-time streaming in a type of data processing in which data is collected, processed and analyzed in real-time or near real-time as it is generated. In the context of data ingestion, real-time streaming can be used in applications. Batch processing can be a cost-effective way to process large amounts of data while minimizing resource usage in some data processing applications. Real-time processing can utilize more resources than batch processing. However, real-time processing can provide benefits that outweigh the costs in some applications that would improve from real-time or near real-time data-driven insights, such as real-time or near real-time cybersecurity monitoring.

Recommendation system 120 can further include analytics system 140 that can analyze ingested data to generate analysis output 145. For example, the ingested data can be obtained at least from data storage system 135. The ingested data can include data ingested from XR and/or non-XR sources.

More specifically, the analysis can use at least one ML model 143 trained to generate a personalized recommendation for a user based on input data. Each ML model can be trained using a training dataset including historical data (e.g., labeled data and/or unlabeled data), with the goal of teaching the ML model to identify relationships between input data and output data. For example, at least one ML model 143 can be trained by associating input training data representing data for respective users (e.g., combinations of health and wellness data, financial data, demographic data, and miscellaneous data) to respective output recommendations determined to be optimal for the input training data. Thus, at least one ML model 143 can be trained to generate, for input data representative of a user, a personalized recommendation that is predicted to be optimal for the user based on the ingested data. Further details regarding training ML models will be described herein below.

In some implementations, analyzing the ingested data includes performing NLP to extract meaning from the ingested data. In some implementations, analyzing the ingested data includes performing predictive modeling based on the input data. Predictive modeling refers to the use of an ML model to make predictions about future events or trends based on input data. A ML model can be trained using a training dataset including historical data (e.g., labeled data and/or unlabeled data), with the goal of teaching the ML model to identify relationships between input data and output data corresponding to future events or trends.

In some implementations, analyzing the ingested data includes using an ML model including a neural network (NN). An NN can include an input layer and an output layer. A NN can be a feedforward neural network (FNN) or a recurrent neural network (RNN). In some implementations, a neural network includes a set of hidden layers between the input layer and the output layer. For example, the neural network can be at least one of a deep neural network (DNN), a deep belief network (DBN), a recurrent neural network (RNN), a convolutional neural network (CNN), a generative model such as a transformer (e.g., generative pre-trained transformer (GPT)), etc.

In some implementations, analysis output 145 includes a personalized recommendation generated for a user. For example, the personalized recommendation can be a personalized plan for the user related to achieving a goal or target. Generating the personalized recommendation for a user can include identifying a set of factors from the ingested data for the user that impact a plan for the user, and providing a personalized plan for the user with respect to the set of factors. For example, the set of ML models can include at least one ML model trained by associating input training data representing data for respective users (e.g., combinations of health and wellness data, financial data, demographic data, and miscellaneous data), to respective output recommendations determined to be optimal for the input training data. Thus, the set of ML models can be trained to generate, for input data representative of a user, a personalized recommendation that is predicted to be optimal for the user for the input data.

Illustratively, a personalized plan can be a personalized retirement plan. In some implementations, a personalized retirement plan includes a lifetime income management plan. For example, generating a personalized retirement plan for a user can include identifying, from the ingested data, a set of factors that impact retirement planning for the user, and using at least one ML model to generate a personalized retirement plan with respect to the set of factors. Examples of factors that impact retirement planning can include income, expenses, savings rates, investment performance, investment allocation, retirement plan contributions, retirement account balances, entitlement benefits (e.g., Social Security and/or defined benefit plan), investment returns, healthcare costs, withdrawal strategies, tax rates, etc.

For example, recommendation system 120 can generate a personalized retirement plan for a user during an accumulation phase. The term "accumulation phase" refers to the period in which the user is saving assets for retirement (e.g., a pre-retirement period). Thus, a personalized retirement plan for a user during the accumulation phase can be generated to optimize resource accumulation prior to retirement. Generating a personalized retirement plan for the user during the accumulation phase can include using at least one ML model 143 to, based on the input data obtained for the user, predict future income and expenses, simulate investment returns, estimate retirement account balances, etc. For example, at least one ML model 143 can be used to perform market analysis to identify market trends and investment opportunities that are likely to provide the most benefit to the user by analyzing historical market data and identifying patterns that are likely to repeat in the future. Additionally, recommendation system 120 can determine actions regarding, e.g., savings rates, investment allocation and retirement plan contributions, which can be recommended to the user and/or automatically performed without additional user interaction. For example, recommendation system 120 can recommend and/or take investment actions based on the market analysis, which can be tuned using a set of user parameters (e.g., risk tolerance, investment preferences and/or financial goals). Recommendation system 120 can continually update the personalized retirement plan for the user during the accumulation phase in response to identifying changes that should be made to the personalized retirement plan to maximize retirement income and/or minimize retirement costs. Accordingly, recommendation system 120 can be used by users who are not yet retired in order optimize resource accumulation prior to retirement.

As another example, recommendation system 120 can generate a personalized retirement plan for a user during a decumulation phase. The term "decumulation phase" refers to the period in which the user is withdrawing assets during retirement (e.g., a post-retirement period). Thus, a personalized retirement plan for a user during the decumulation phase can be generated to optimize resource consumption during retirement. Generating a personalized retirement plan for the user during the decumulation phase can include using at least one ML model 143 to simulate different withdrawal strategies and estimate the probability of asset depletion in retirement. By using these simulations, recommendation system 120 can determine actions regarding asset withdrawal, which can be recommended to the user and/or automatically performed without additional user interaction. For example, recommendation system 120 can determine actions regarding how to maximize retirement income, such as by analyzing entitlement benefits (e.g., Social Security and/or defined benefit plan), investment returns, and other sources of incomes. As another example, recommendation system 120 can determine actions regarding how to minimize various retirement costs, such as taxes, healthcare, etc. Recommendation system 120 can continually update the personalized retirement plan for the user during the decumulation phase in response to identifying changes that should be made to the personalized retirement plan to maximize retirement income and/or minimize retirement costs. Accordingly, recommendation system 120 can be used by users who are currently retired in order to optimize resource decumulation during retirement.

In some implementations, recommendation system 120 causes at least one action to be performed automatically without additional user input based on analysis output 145. For example, recommendation system 120 can cause a personalized recommendation to be presented to a user via a user interface (e.g., accessible via website 150, application 152, client device 154 and/or IoT device 156). As another example, recommendation system 120 can cause a set of actions to be presented to the user (e.g., via website 150, application 152, client device 154 and/or IoT device 156). The set of actions can include at least one action that is recommended to be performed that can impact a factor to achieve a target determined for the user from analysis output 145. For example, with respect to a personalized retirement plan for a user, the set of actions can include an adjustment to a retirement factor to achieve a retirement target defined for the user, such as adjusting contributions to various user accounts (e.g., savings accounts, retirement accounts), rebalancing of various user accounts, etc. In some implementations, recommendation system 120 performs the set of actions upon receiving confirmation from the user via the user interface. In some implementations, recommendation system 120 automatically performs the set of actions without additional user interaction. For example, there can be a setting that gives recommendation system 120 the ability to automatically take actions on behalf of the user determined by recommendation system 120 to be needed to achieve the at least one target. Recommendation system 120 can then cause a message to be sent to the user (e.g., via electronic mail, text message and/or push notification on a client device) that describes each action that was performed.

In some implementations, recommendation system 120 enables user exploration of various personalized plan scenarios. For example, recommendation system 120 can generate a set of scenarios for a user by modifying various factors that impact at least one target over time, and cause the set of scenarios to be provided to the user via a user interface. For example, in the context of a personalized retirement plan for a user, recommendation system 120 can provide the user with a set of retirement plan scenarios by modifying various factors such as investment strategies, retirement account contributions, withdrawal strategies, etc. Each retirement plan scenario provided to the user can show how modifying the various factors can impact retirement savings, income streams, expenses, etc.

In some implementations, recommendation system 120 generates at least one digital representation for a user based on a personalized recommendation, and provides the at least one digital representation to the user. For example, analytics system 140 can use at least one ML model 143 to generate a digital representation. The digital representation can provide an illustration of aspects of the user's future that is predicted based on the user data. Illustratively, for a personalized retirement plan, the digital representation can relate to a future predicted for the user that can be realized by following the personalized retirement plan (e.g., a future house, future vacations, etc.).

In some implementations, recommendation system 120 generates an XR representation for a user. The XR representation can be generated using at least one ML model. Generating the XR representation can include generating a virtual environment, generating a data model personalized for the user, creating a persona for the user, and/or creating a virtual avatar for the user within the virtual environment.

In some implementations, recommendation system 120 generates a non-XR representation for a user. The non-XR representation can be generated using at least one ML model. Examples of non-XR representations include audio representations, visual representations, audiovisual representations and/or textual representations.

Recommendation system 120 can then provide the digital representation to the user. More specifically, recommendation system 120 can make an XR representation accessible to the user via an XR system (e.g., VR system, AR system and/or MR system) and/or a non-XR representation accessible to the user via a non-XR system (e.g., laptop, mobile device and/or personal computer). In some implementations, recommendation system 120 converts a first digital representation into a second digital representation using at least one ML model 143. For example, the first digital representation can be an XR representation and the second digital representation can be a non-XR representation. As another example, the first digital representation can be a first type of non-XR representation and the second digital representation can be a second type of non-XR representation. For example, recommendation system 120 can convert text of a textual representation to speech of an audio representation using a text-to-speech method so that the user can read about the digital representation. As another example, recommendation system 120 can convert speech of an audio representation to text of a textual representation using a speech-to-text method.

In some implementations, recommendation system 120 receives feedback derived from user interactions and updates the digital representation based on the feedback. For example, the feedback can include feedback derived from user interactions within the virtual environment. Digital representation engine 149 can support the generation of provision of at least one digital representation for a user (e.g., XR representation and/or non-XR representation). In some implementations, digital representation engine 149 receives user feedback, and updates the at least one digital representation based on the user feedback. In some implementations, digital representation engine 149 can convert a first digital representation into a second digital representation.

In some implementations, recommendation system 120 supports the use of a digital assistant that can interact with a user using at least one ML model 143. For example, the digital assistant can be a conversational AI platform (e.g., chatbot) that can receive a prompt via a user interface, and generate a command from the content of the prompt to use at least one ML model 143 trained to generate an output based on stored data obtained from the multiple components/products within the computing system. In some implementations, at least one ML model 143 includes a language model trained on a corpus of text to generate an output response for a prompt received from a user device. For example, a language model can be a large language model (LLM). In some implementations, at least one ML model 143 includes a GPT model. For example, the prompt can be a voice prompt or a text prompt that is converted into a command to generate a personalized recommendation and/or a digital representation of the personalized representation for the user. The digital assistant can be implemented using an interactive digital avatar displayed via a user interface. For example, the output can be a result displayed via a user interface. Further details regarding system 100 will now be described below with reference to FIGS. 2-7.

Figure 2:
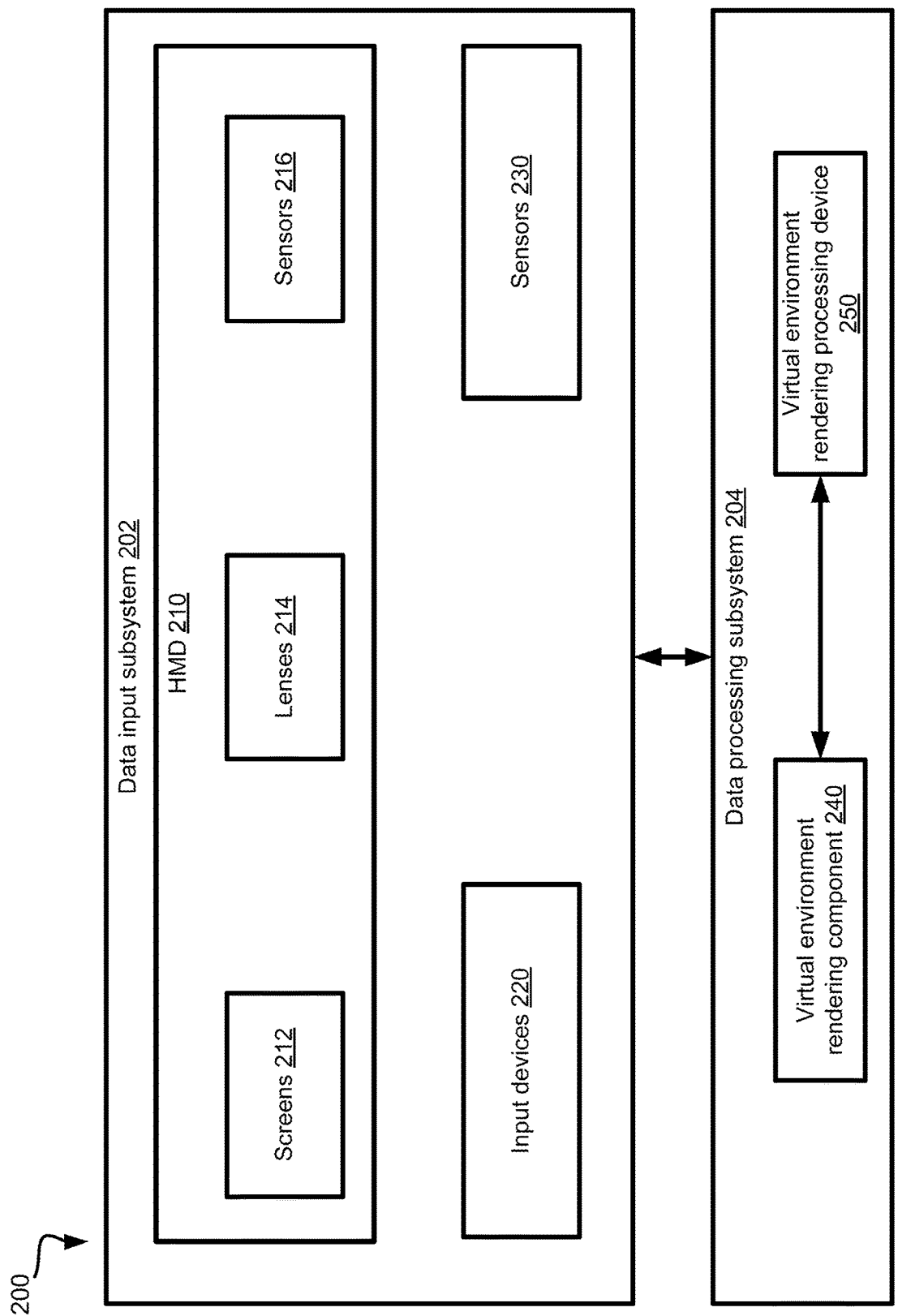

FIG. 2 is a diagram of XR system ("system") 200, in accordance with some implementations. System 200 can include data input subsystem 202 and data processing subsystem 204. Data input subsystem 202 can include a set of data collection components that can be used to obtain data from a user (e.g., user motion data, user input data), and data processing subsystem 204 can include a set of data processing components that can be used to process the data obtained from the user to cause actions to be performed within a virtual environment.

For example, data input subsystem 202 can include head-mounted display (HMD) 210. Examples of head-mounted displays include headsets, glasses, etc. HMD can include set of screens 212 (e.g., high-resolution display screens), set of lenses 214, and set of sensors 216. Set of screens 210 can include multiple screens (e.g., a pair of screens) that can collectively generate a 3D visual effect for the user. Set of lenses 214 can include lenses to help focus images and adjust for user interpupillary distance (i.e., the distance between the centers of the user's eyes). Set of sensors 216 can be used to track the position and/or movement of HMD 210 and/or the user's head. Examples of sensors of set of sensors 216 can include accelerometers, gyroscopes, etc.

User subsystem 202 can further include set of input devices 220 that can allow the user to interact with the virtual environment. For example, set of input devices 220 can include at least one of: one or more hand controllers, one or more joysticks, etc. Data input subsystem 202 can further include set of sensors 230. More specifically, set of sensors 230 can include a set of motion tracking sensors to detect user movements and convert user movements into responses within the virtual environment. For example, set of sensors 230 can include one or more cameras to track the position and/or movement of the HMD and/or set of input devices 220, one or more inertial sensors to detect user movement, etc. Set of sensors 230 can be placed within a room to optimize movement detection.

Data processing subsystem 204 can include virtual environment rendering component 240. Virtual environment rendering component 240 can be used to render a virtual environment that is realistic and immersive for the user for an XR application (e.g., VR, AR and/or MR). Data processing subsystem 204 can utilize a high level of graphics processing power to render the virtual environment in real-time or near real-time. For example, data processing subsystem 204 can use set of virtual environment rendering devices 250 to render the virtual environment in real-time or near real-time. Set of virtual environment rendering processing devices 250 can include hardware components, such as specialized graphics cards, high-performance processing units (e.g., central processing units (CPUs) and/or graphics processing units (GPUs), and/or other hardware components. Further details regarding XR system 200 are described above with reference to FIGS. 1A-1B and will be described in further detail below with reference to FIGS. 3-6B.

Figure 3:
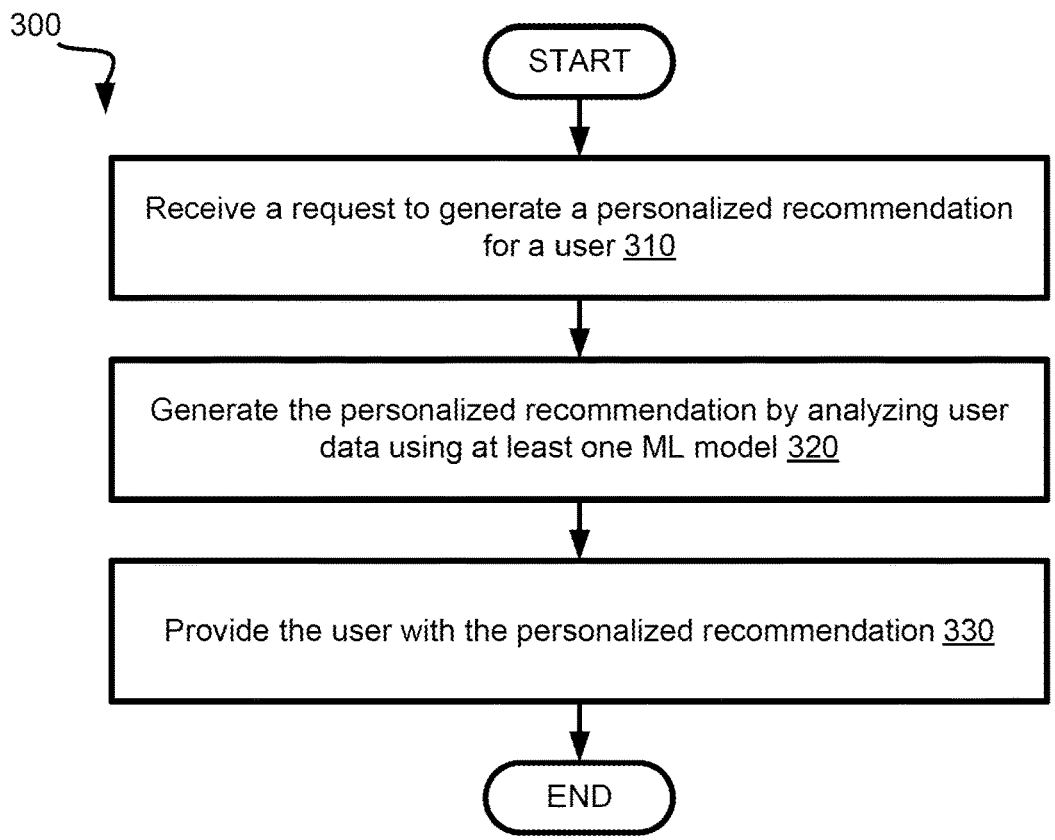
FIGS. 3-6B are flow diagrams of example methods to implement recommendation systems for generating virtual environments based on personalized recommendations, in accordance with some implementations of the present disclosure.

FIG. 3 is a flow diagram of an example method 300 to implement recommendation systems integrating XR to generate personalized recommendations, in accordance with some implementations of the present disclosure. Method 300 can be performed by at least one processing device that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 300 is performed by one or more components of computing system 100 of FIG. 1A. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 310, processing logic receives a request to generate a personalized recommendation for a user. In some implementations, the request is a request to generate is a personalized plan for the user related to achieving a goal or target. For example, the request can be a request to generate a personalized retirement plan for the user. In some implementations, the request is received from a computing device associated with the user. The computing device can also be referred to as a user device. For example, the request can received from a user interface provided via an application installed on the computing device. Examples of computing devices include mobile devices, personal computers, laptops, etc. In some implementations, the request is received via user interaction with a digital assistant. For example, the digital assistant can be a conversational AI platform (e.g., chatbot). In some implementations, the request is received via user interaction within a virtual environment generated by an XR system. For example, the XR system can be a VR system, an AR system or a MR system. Illustratively, with respect to a VR system, the request can be received by a user interacting with a virtual world, observable using an HMD, via a set of input devices.

At operation 320, processing logic generates the personalized recommendation for the user by analyzing user data using at least one ML model. The user data can include data collected from a plurality of data sources associated with the user, and ingested into a data format for use by the at least one ML model. The user data can include structured data and/or unstructured data. Examples of user data include health and wellness data, financial data, demographic data, and miscellaneous data. Examples of health and wellness data include activity data, heart rate data, blood pressure data, pulse data, oximeter data, etc. Examples of financial data include spending pattern data, economic indicator data, market trend data, income data, expense data, savings rate data, investment performance data, investment allocation data, retirement plan contribution data, retirement account balance data, entitlement benefit data (e.g., Social Security and/or defined benefit plan), investment return data, healthcare cost data, withdrawal strategy data, tax rate data, housing cost data, etc. Examples of miscellaneous data include travel or vacation data, regulatory data, etc. In some implementations, generating the personalized recommendation includes ingesting the data collected from the plurality of data sources (e.g., using ETL), as described in further detail above with reference to FIGS. 1A-3.

In some implementations, the plurality of data sources includes at least one non-XR data source. For example, the at least one non-XR data source can include a website, an application, an IoT device and/or a client device. Examples of data that can be obtained from a non-XR data source include data obtained from social media channels, data obtained from financial websites, data obtained from electronic mail accounts, data obtained from online surveys, data obtained from travel or vacation websites, health and wellness data, etc.

In some implementations, the plurality of data sources includes at least one XR data source. For example, the at least one XR data source can include a VR data source, an AR data source and/or an MR data source. Examples of data that can be obtained from an XR data source include data resulting from interactions by the user within a virtual environment (e.g., virtual world), such as interaction with digital objects, digital people (i.e., digital avatars), digital locations, etc.

The user data can include a set of factors related to the personalized recommendation. More specifically, the set of factors include at least one factor that has an impact on the personalized recommendation. Examples of factors that impact retirement planning can include income, expenses, savings rates, investment performance, investment allocation, retirement plan contributions, retirement account balances, entitlement benefits (e.g., Social Security and/or defined benefit plan), investment returns, healthcare costs, withdrawal strategies, tax rates, etc. In some implementations, the user data is obtained by using a gamification technique.

Generating the personalized recommendation for the user can include parsing and interpreting the user data utilizing the at least one ML model. The at least one ML model is trained to digest the user data, identify at least one pattern from the user data, and generate at least one prediction for generating the personalized plan tailored to the user based on the at least one pattern. In some implementations, the at least one ML model includes an NLP model. In some implementations, the at least one ML model includes a predictive model. In some implementations, the at least one ML model includes a deep learning model. In some implementations, the at least one ML model includes at least one NN. For example, the NN can include an FNN, an RNN, a DNN, a DBN, a CNN, and/or a transformer (e.g., GPT), etc. The at least one ML model can be updated and/or trained using feedback data and/or training data by employing any suitable ML model updating and/or ML training methods. Further details regarding updating the at least one ML model will be described in further detail below with reference to FIG. 4 and further details regarding training the at least one ML model will be described in further detail below with reference to FIG. 5.

In some implementations, generating the personalized recommendation includes generating a personalized retirement plan for the user. For example, generating a personalized retirement plan for a user can include generating a personalized retirement plan related to an accumulation phase of the user. As another example, generating a personalized retirement plan for a user can include generating a personalized retirement plan related to a decumulation phase of the user.

In some implementations, generating the personalized recommendation includes generating a set of personalized plan scenarios for the user. For example, the set of personalized plan scenarios can be obtained by modifying various factors of the set of factors, where the set of personalized plan scenarios can show how modifying various factors can impact plans. Illustratively, in the context of personalized retirement plans, various factors such as investment strategies, retirement account contributions, withdrawal strategies, etc. can be modified, which can show the impact on different retirement scenarios relating to retirement savings, income streams, expenses, etc. over time.

In some implementations, generating the personalized recommendation includes generating an updated personalized recommendation. For example, data can be continually monitored in order to determine whether at least one change is needed to achieve at least one target defined by a plan. In response to determining that at least one change is needed, the updated personalized recommendation can be generated based on the at least one change.

In some implementations, generating the personalized recommendation includes generating at least one data summary. For example, generating the at least one data summary can include using at least one ML model to generate the at least one data summary based on at least one dataset for a user.

At operation 330, processing logic provides the user with the personalized recommendation. For example, providing the user with the personalized recommendation can include causing the personalized recommendation to be displayed via a user interface accessible by the user. Additionally or alternatively, providing the user with the personalized recommendation can include causing access to view the personalized recommendation to be provided to the user, such as via at least one of electronic mail, an application, a hyperlink, an XR system (e.g., displayed via an HMD), etc. Additionally or alternatively, providing the user with the personalized recommendation can include providing a recommendation of at least one action to take to achieve at least one target of a plan. Additionally or alternatively, providing the user with the personalized recommendation can include automatically performing the at least one action without additional user interaction.

In some implementations, providing the user with the personalized recommendation includes providing a digital representation related to the personalized recommendation. For example, an ML model can be used to generate a digital representation using the data. In some implementations, providing the user with the personalized recommendation includes enabling the user to access, via an XR system, a virtual environment generated based on the personalized recommendation (e.g., using an ML model). For example, processing logic can generate the virtual environment based on the personalized recommendation. That is, the personalized recommendation can be converted into an XR representation modeled in accordance with the personalized recommendation. For example, the XR system can be a VR system and the virtual environment can include a virtual world accessible to the user via the VR system. The virtual environment can provide an illustration of aspects of the user's future that is predicted based on the user data. Illustratively, for a personalized retirement plan, the virtual environment can generate a future world in which the user could live in by following the personalized retirement plan (e.g., a future house, future vacations, etc.). In some implementations, providing the user with the personalized recommendation further includes generating at least one non-XR representation of the virtual environment (e.g., a "digital experience"). Examples of non-XR representations of a virtual environment include audio representations, visual representations, audiovisual representations and/or textual representations. In some implementations, providing the user with the personalized recommendation includes providing the user with the at least one data summary.

In some implementations, providing the user with the personalized recommendation can include using machine learning perform dynamic content generation, and adjusting the recommendation presentation based on user preferences. The recommendation may be delivered through an ML-enhanced user interface that adjusts the personalized recommendation according to the user's interaction patterns. Natural Language Generation (NLG) may be utilized to automatically generate a natural language output related to the personalized recommendation. The natural language output can present the personalized recommendation in a conversational manner to improve user engagement and comprehension.

In some implementations, an interpretability technique can be used to explain the personalized recommendation generated by the at least one ML model. The interpretability techniques can be used to explain each prediction made by the at least one ML model, which can help provide users (who may be technically unsophisticated) with an understanding into the decision-making process used by the at least one ML model to generate each prediction. Examples of interpretability techniques include local interpretability techniques and global interpretability techniques. A local interpretability technique is used to explain a prediction made by an ML model on an individual level by observing how the prediction made by the ML model changes as the features input into the ML model are perturbed. A global interpretability technique is used to explain a prediction made by an ML model on an individual level by observing how the prediction made by the ML model changes as the features input into the ML model are perturbed. Examples of interpretability techniques include Shapely Additive explanations (SHAP), Local Interpretable Model-Agnostic Explanations (LIME), etc. Further details regarding operations 310-330 are described above with reference to FIGS. 1A-2 and will now be described in further detail below with reference to FIGS. 4-5.

Figure 4:
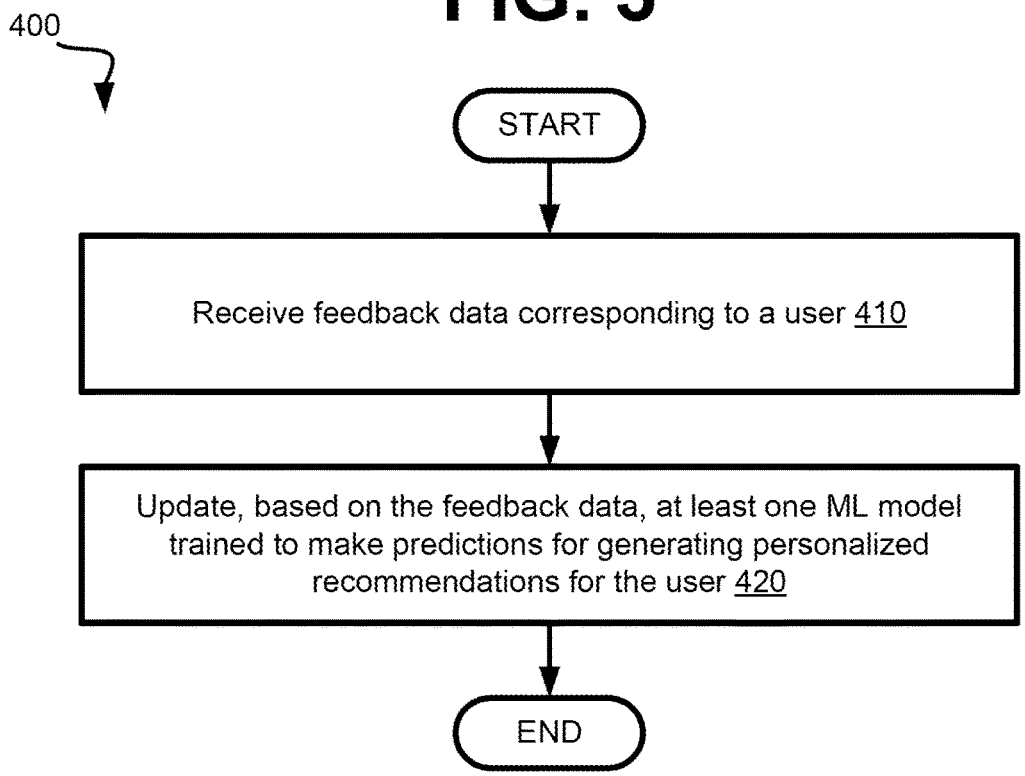

FIG. 4 is a flow diagram of an example method 400 to update ML models implemented by recommendations systems integrating XR to generate personalized recommendations, in accordance with some implementations of the present disclosure. Method 400 can be performed by at least one processing device that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 400 is performed by one or more components of computing system 100 of FIG. 1A. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 410, processing logic receives feedback data corresponding to a user. The feedback data can include data indicative of user behavior and/or user preferences. In some implementations, the feedback data is generated from interactions by the user. In some implementations, the feedback data is derived as feedback received from user interaction. For example, the user interaction can include a response received from a user device. One type of feedback received from user interaction is explicit feedback. Examples of user feedback include user ratings, user comments, etc. Another type of feedback received from user interaction is implicit feedback. Examples of implicit feedback include click-through rates, time spent viewing the personalized recommendation, actions that a user took after viewing the personalized recommendation, etc. In some implementations, the feedback data includes data generated from interactions by the user within a virtual environment (e.g., virtual world) accessible via an XR system (e.g., VR system, AR system and/or MR system). Accordingly, the feedback data can be received from at least one data source, such as an XR system.

At operation 420, processing logic updates, based on the feedback data, at least one ML model trained to make predictions for generating personalized recommendations for the user. One purpose of updating the at least one ML model is to refine the personalized recommendations generated for the user (e.g., make the personalized recommendations more relevant to the user). Updating the at least one ML model can include at least one of: retraining the at least one ML model with an updated dataset generated from the feedback data, adjusting a set of parameters of the at least one ML model, selecting at least one new ML model determined to generate a more accurate personalized recommendation based on the feedback data, etc. Operations 410-420 can be implemented as a continuous feedback loop to cater to evolving needs and/or preferences of the user.

In some implementations, the at least one ML model is updated using reinforcement learning. Reinforcement learning involves training an agent to make decisions by learning from its interactions with an environment. The agent learns through trial-and-error by taking actions and receiving feedback in the form of rewards or penalties. The goal of the agent is to maximize its cumulative reward over time by learning which actions to take in different situations. In reinforcement learning, the agent is not given labeled data, as is the case in supervised learning, but rather learns from the feedback it receives from the environment. The agent is also not given explicit instructions on how to behave, as is the case in rule-based systems, but rather learns by exploring and discovering optimal strategies through repeated interactions with the environment. Accordingly, reinforcement learning methods generally balance exploration (trying new actions to learn) and exploitation (using actions that have worked well in the past) to achieve optimal performance.

One type of reinforcement learning model is a value-based model, where an agent learns to estimate the value of taking various actions in different states of an environment. Another type of reinforcement learning model is a policy-based model, where the agent learns a policy that directly maps states to actions. Another type of reinforcement learning model is a model-based model, where an agent learns a model of an environment and uses the model to make decisions. Another type of reinforcement learning model is a deep reinforcement learning model, which combines reinforcement learning with DNNs to enable the agent to learn from high-dimensional sensory inputs, such as images, speech, etc. Another type of reinforcement learning model is a multi-agent reinforcement learning model, where multiple agents interact with each other within the same environment (e.g., cooperative multi-agent reinforcement learning or competitive multi-agent reinforcement learning). The choice of the reinforcement learning model depends on the specific problem and the nature of the environment and the agent. For example, value-based models can be used for problems with discrete actions and states, while policy-based models can be used for problems with continuous actions and states. Deep reinforcement learning models can be used when the agent needs to learn from high-dimensional sensory inputs. Multi-agent reinforcement learning models can be used for problems with multiple agents or complex interactions.

For example, the feedback data can indicate whether a user approves or disapproves of an item, such as a personalized recommendation and/or at least one aspect of a digital representation. An agent can be trained to learn a policy that maps a user's current state, such as the items the user has already interacted with, to an action, such as recommending a new item to the user. The policy is optimized to maximize the expected reward, which can be defined as the user's satisfaction or engagement with the system. By using this feedback, an agent of a reinforcement learning method can learn whether the user like the personalized recommendation and/or the digital representation, or whether the personalized recommendation and/or digital representation should be adjusted to better conform with the user's behavior and/or preferences. One of the advantages of using reinforcement learning for generating personalized recommendations and/or digital representations is that it can adapt to changes in the user's preferences over time. As the user interacts with the system, the agent can continuously update its policy to incorporate new information and adjust the recommendations accordingly. Further details regarding operations 410-420 are described above with reference to FIGS. 1A-3 and will be described in further detail below with reference to FIG. 5.

Figure 5:
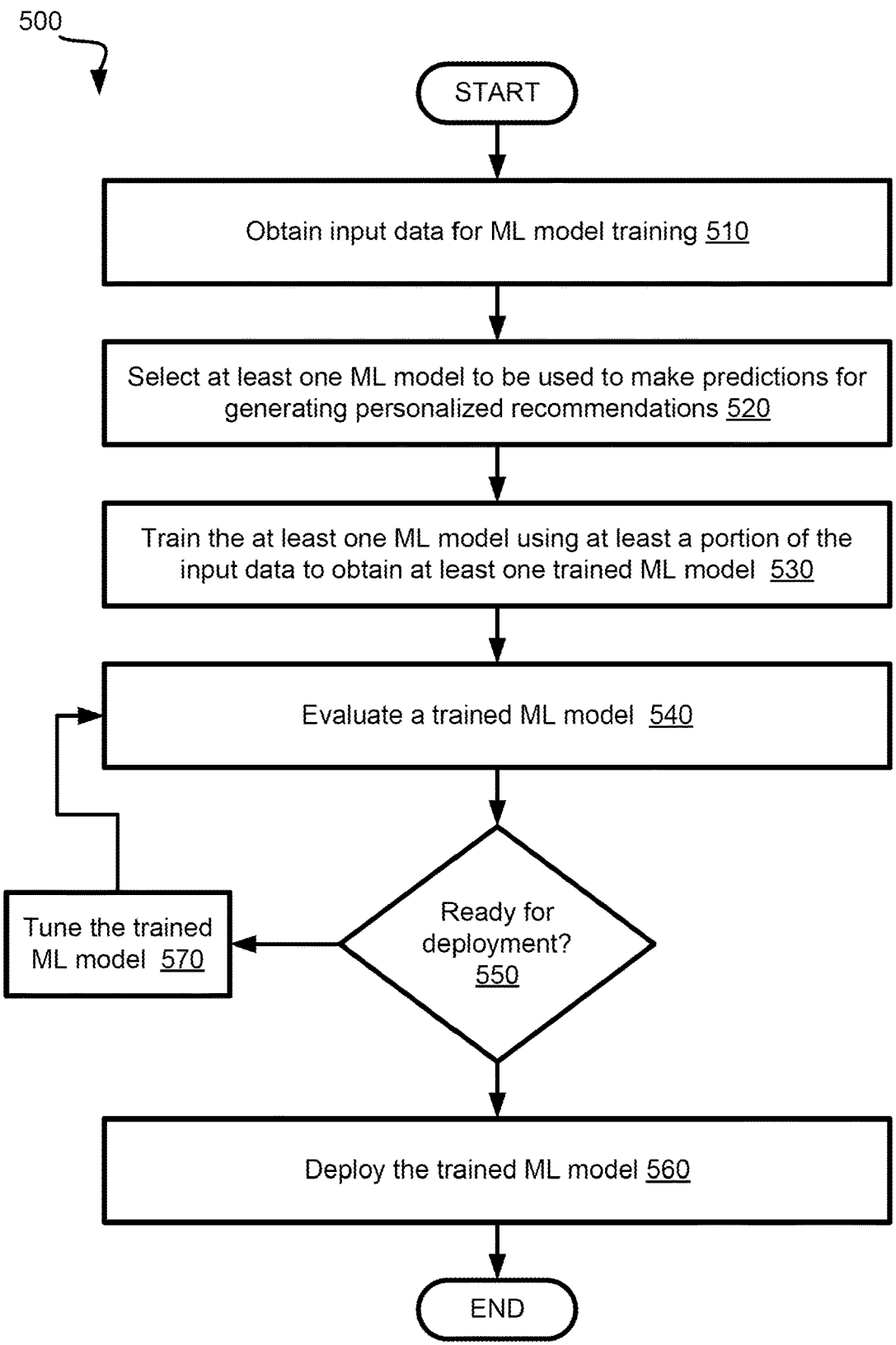

FIG. 5 is a flow diagram of an example method 500 to manage deployment of ML models implemented by recommendations systems integrating XR to generate personalized recommendations, in accordance with some implementations of the present disclosure. Method 500 can be performed by at least one processing device that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 500 is performed by one or more components of computing system 100 of FIG. 1A. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 510, processing logic obtains input data for ML model training. Obtaining the input data can include ingesting data collected from a set of data sources, and storing the ingested data as the input data. For example, the data collected from the set of data sources can include non-XR data obtained from a set of non-XR data sources (e.g., websites, applications, IoT devices and/or client devices). As another example, the data collected from the set of data sources can include XR data obtain from a set of XR data sources (e.g., VR systems, AR systems and/or MR systems). As yet another example, the data collected from the set of data sources can include synthetic data to simulate actual non-XR data and/or XR data. In some implementations, the data collected from set of data sources includes raw data, and obtaining the input data can further include preprocessing the raw data. For example, obtaining the input data can include performing, with respect to the raw data, at least one of: data cleaning, categorical variable encoding, dimensionality reduction, feature scaling, NLP, etc.

In some implementations, dimensionality reduction is performed to reduce dimensionality of features extracted from the raw data while preserving relevant information contained within the raw data. Dimensionality reduction can enable various improvements to the ability of a processing device to train the at least one ML model. For example, by reducing the number of features, dimensionality reduction can improve the computational efficiency and reduce storage resource consumption for training at least one ML model. As another example, dimensionality reduction can increase ML model prediction accuracy by filtering out irrelevant features within the raw data (e.g., noise). As yet another example, by reducing the dimensionality of the data, dimensionality reduction can mitigate effects of overfitting that may be observed by training the at least one ML model with higher-dimensional data. Overfitting refers to a phenomenon in which a ML model performs well on the input data used to train the at least one ML model, but not as well on new, unseen data. In some implementations, performing dimensionality reduction includes performing feature selection. Performing feature selection includes selecting, from a set of features, a subset of relevant features and discarding the remaining features of the set of features. In some implementations, performing dimensionality reduction incudes performing feature extraction. Feature extraction includes transforming an initial set of features into a set of relevant features. For example, each feature of the set of relevant features obtained using feature extraction can be a linear combination of features of the initial set of features. In some implementations, performing dimensionality reduction includes performing matrix factorization. Examples of techniques that can be used to perform dimensionality reduction include Principal Component Analysis (PCA), Kernel PCA, Sparse PCA, Incremental PCA, Linear Discriminant Analysis (LDA), Independent Component Analysis (ICA), t-Distributed Stochastic Neighbor Embedding (t-SNE), autoencoding, Isometric Mapping (Isomap), Locally Linear Embedding (LLE), random linear projections, Truncated Singular Value Decomposition (SVD), matrix factorization, etc.

In some implementations, feature scaling is performed to normalize the scale of features of the set of features. A scale of a feature refers to the range of values that the feature can take within data. For example, an age feature can range from 0 to 100, while an income feature can range from 0 to 1,000,000. Feature scaling is performed since some ML models can be sensitive to feature scale. Feature scaling can improve computational efficiency by improving convergence speed and/or ML model performance. Examples of feature scaling techniques include min-max scaling to scale features to a range (e.g., between 0 and 1), Z-score scaling to transform features to have a mean of 0 and a standard deviation of 1, etc.

At operation 520, processing logic selects at least one ML model to make predictions for generating personalized recommendations. Selection of a ML model can depend on various factors, such as the ML task (e.g., generalized personalized recommendations), computational resource availability, desired prediction accuracy, etc. In some implementations, the at least one ML model includes a predictive model. In some implementations, the at least one ML model includes at least one NN. For example, the at least one NN can include at least one of: an FNN, an RNN, a DNN, etc. In some implementations, the at least one ML model includes a deep learning model.

In some implementations, the at least one ML model includes a collaborative filtering model to generate a personalized recommendation for a user. For example, a collaborative filtering model can be a user-based collaborative filtering model in which a personalized recommendation can be made for a user based on a cohort of similar users (e.g., users having similar data profiles, preferences, behaviors). As another example, a collaborative filtering model can be an item-based collaborative filtering model in which a personalized recommendation can be made for a user based on a similarity of items that the user had previously interacted with (e.g., shown interest in).

In some implementations, the at least one ML model includes a content-based filtering model to generate a personalized recommendation for a user. Generally, a content-based filter model generates a personalized recommendation for a user based on both attributes of items and preferences of the user. That is, a personalized recommendation generated by a content-based filtering model can generate a personalized recommendation for a user based on things that the user has already shown interest in.

In some implementations, the at least one ML model includes a hybrid model. For example, a hybrid model can combine collaborative filtering with another technique, such as content-based filtering.

In some implementations, a ML model is a supervised learning model that can be trained using a supervised learning method. A supervised learning method utilizes labeled training datasets to train a machine learning model to make predictions. More specifically, a supervised learning method can be provided with input data (e.g., features) and corresponding output data (e.g., target data), and the ML model learns to map the input data to the output data based on the examples in the labeled dataset. For example, to train the ML to perform a classification, the input data can include various attributes of an object or event, and the output data may be a label or category. The labeled dataset would contain examples of these objects or events along with their corresponding labels. The ML model would be trained to map the input data to the correct label by analyzing the examples in the labeled dataset. Examples of supervised learning methods include linear regression learning, logistic regression learning, decision tree learning, SVM learning, learning, gradient boosting learning, etc.

In some implementations, a ML model is an unsupervised learning model that can be trained using an unsupervised learning method. An unsupervised learning method trains a machine learning model to make predictions without using labeled training datasets. More specifically, a supervised learning method can be provided with input data (e.g., features) without corresponding output data (e.g., target data), and the ML model learns to map the input data to output data by identifying relationships (e.g., patterns) within the input data. For example, identifying relationships within the input data can include identifying groups of similar datapoints (e.g., clusters), or underlying structures within the input data. Examples of unsupervised learning methods include clustering (e.g., k-means clustering, principal component analysis (PAC), autoencoding, etc.

In some implementations, a ML model is a semi-supervised learning model that can be trained using semi-supervised learning. In contrast to supervised learning where the input data includes only labeled training datasets, and unsupervised learning where the input data does not include any labeled training datasets, semi-supervised learning involves training an ML model to make predictions using datasets that include a combination of labeled data and unlabeled data. Semi-supervised learning can be used to improve the accuracy of the ML model, such as in cases where obtaining a labeled data is expensive and/or time-consuming. For example, a labeled training dataset can be used to learn the structure of a machine learning modeling problem, and the unlabeled training dataset can be used to identify general features of the data. Examples of semi-supervised learning methods include self-training, co-training, and multi-view learning.

Self-training refers to a method in which labeled data of a dataset is used to train an initial ML model, and the initial ML model is then used to make label predictions for unlabeled data of the dataset. The most confidently predicted outputs can be added to the labeled data to obtain an expanded dataset, the ML model can then be retrained on the expanded dataset. The training process can stop when there is no additional improvement to ML model performance.

Co-training refers to a method in which each ML model of a group of ML models (e.g., a pair of ML models) is trained on a respective subset of labeled data of a dataset to predict labels of unlabeled data of the dataset. For example, each ML model can be a classifier model. The most confidently predicted outputs can be added to the labeled data to obtain an expanded dataset, and each ML model can be retrained using the expanded dataset. The training process can stop when each ML of the group of ML models converges and/or when there is no additional improvement to ML model performance.

Multi-view learning refers to a method in which multiple ML models are each trained on a respective view of data. Each view of data can be obtained in a particular way, such as using different feature representations, different sensors, or different modalities. The individual predictions made by the ML models can then be combined to make a final prediction.

In some implementations, the ML model is a reinforcement learning model that can be trained using reinforcement learning. Examples of reinforcement learning models include value-based models, policy-based models, model-based models, deep reinforcement learning models, multi-agent reinforcement learning models, etc.

At operation 530, processing logic trains the at least one ML model using at least a portion of the input data to obtain a trained ML model. Generally, training a ML model generally involves adjusting the parameters of the ML model to minimize the difference between a prediction made by the ML model using the input data and corresponding ground truth. For example, a prediction made by a ML model using the input data can be a personalized recommendation predicted for a user, and the corresponding ground truth can be an actual personalized recommendation determined for the user. Examples of training techniques include gradient descent, backpropagation, etc. The at least one ML model can be trained using at least one of: supervised learning, unsupervised learning, semi-supervised learning, reinforcement learning, etc. In some implementations, training a ML model includes dividing the input data into multiple subsets, and training the ML model on each subset separately (e.g., cross-validation training).

In some implementations, training the at least one ML model includes using regularization technique to prevent overfitting and/or training instability during training. A regularization technique can increase ML model generalization and increase the speed of training convergence. For example, regularization technique can be applied to a deep learning model. Examples of regularization techniques include L1 regularization, L2 regularization, Elastic Net, dropout, batch normalization, etc. The choice of regularization technique can depend on the type of ML model, attributes of the data, etc.

At operation 540, processing logic evaluates a trained ML model. For example, evaluating the trained ML model can include using the trained ML to make a set of predictions using a validation dataset and analyzing the set of predictions to obtain at least one performance metric. In some implementations, the at least one performance metric includes accuracy (e.g., a measure of the proportion of correct predictions of the set of predictions generated by the trained ML model). In some implementations, the at least one performance metric includes at least one of a precision metric or a recall metric (e.g., an F-score). In some implementations, evaluating the trained ML model includes generating a confusion matrix. A confusion matrix refers to a tabular data structure that compares, for a testing dataset, predicted outputs generated by an ML model ("predicted class") to actual outputs generated by the ML model ("actual class"). Entries within the confusion matrix can be used to determine true positives, false positives, true negatives and/or false negatives, which can be used to determine the at least one performance metric (e.g., accuracy, precision, recall and/or F-score).

At operation 550, processing logic determines whether the trained ML model is ready for deployment. For example, determining whether the trained ML model is ready for deployment can include determining whether the at least one performance metric satisfies a threshold performance condition. For example, determining whether the at least one performance metric satisfies a threshold performance condition can include at least one of: determining whether an accuracy of a trained ML model is greater than or equal to a threshold accuracy, determining whether a precision of the trained ML model is greater than or equal to a threshold precision, determining whether a recall of the trained ML model is greater than or equal to a threshold recall, determining whether an F-score of the trained ML model is greater than or equal to a threshold F-score, etc.

If the trained ML model is determined be ready for deployment (e.g., the at least one performance metric satisfies the threshold performance condition), then processing logic at operation 560 can deploy the trained ML model. For example, deploying the trained ML model can include storing the trained ML model, which can be accessible by an analytics system of a recommendation system to generate personalized recommendations. The trained ML model can be periodically updated over time (e.g., tuned) based on feedback data (e.g., non-XR data and/or XR data), as described above with reference to FIG. 4.

If the trained ML model is determined not to be ready for deployment (e.g., the at least one performance metric does not satisfy the threshold performance condition), then processing logic can tune the trained ML model to obtain a tuned ML model at operation 570. In some implementations, tuning the trained ML model can include retraining the ML model using additional training data, similar to operation 530. In some implementations, tuning the trained ML model can include tuning at least one hyperparameter of the trained ML model. The tuned ML model can then be evaluated at operation 540 to determine whether it is ready for deployment at operation 550.

Operations 540-570 can be repeated for any number of ML models that are being trained to generate personalized recommendations for users. Further details regarding operations 510-570 are described above with reference to FIGS. 1A-4.

Figure 6A:
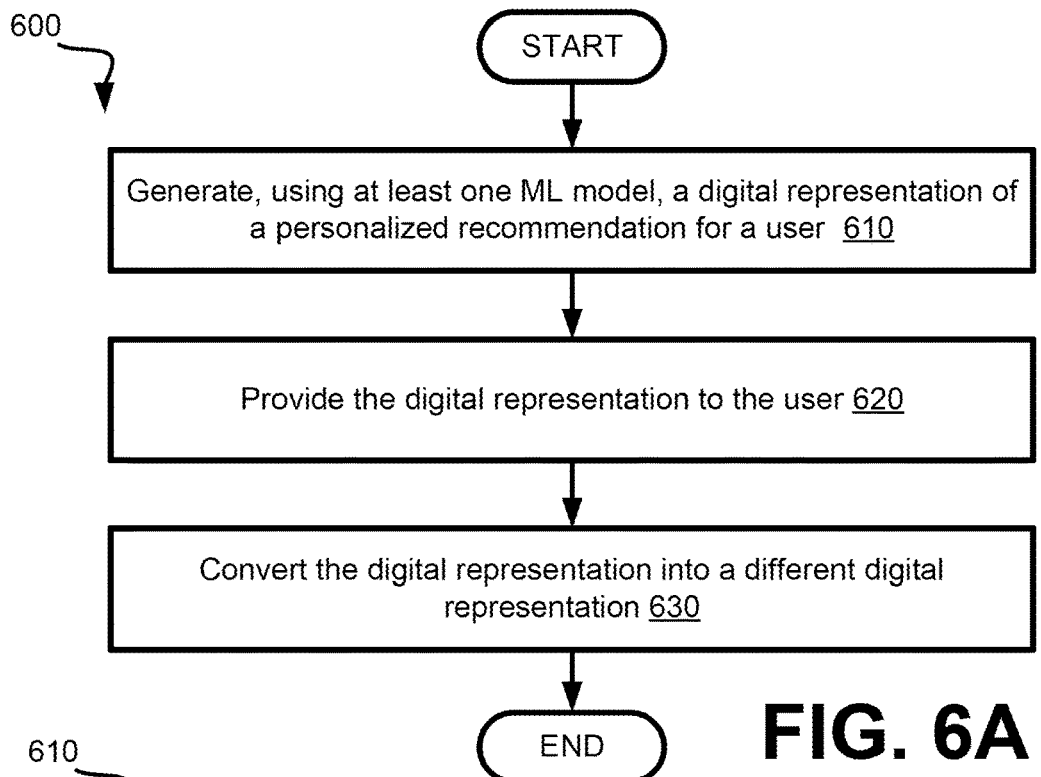

FIG. 6A is a flow diagram of an example method 600 to implement recommendation systems integrating XR to generate personalized recommendations, in accordance with some implementations of the present disclosure. Method 600 can be performed by at least one processing device that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 600 is performed by one or more components of computing system 100 of FIG. 1A. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 610, processing logic generates, using at least one ML model, a digital representation of a personalized recommendation for a user. The digital representation can provide an illustration of aspects of the user's future that is predicted based on the user data. Illustratively, for a personalized retirement plan, the digital representation can relate to a future predicted for the user, which can be realized by following the personalized retirement plan (e.g., a future house, future vacations, etc.). The at least one ML model can further receive, as input data, data that can be used to predict a future state of the world. Such data can be used to generate an optimal digital representation for the user. For example, the at least one ML model can generate a personalized recommendation and/or digital representation that balances a risk profile of the user with a potential future negative externality that may affect the personalized recommendation and/or digital representation. As an illustrative example, the at least one ML model can be trained to predict the effects of climate change across the world over time. As another illustrative example, the at least one ML model can be trained to predict the occurrence of natural disasters across the world over time. Such predictions can be used to determine and/or adjust a personalized recommendation and/or digital representation at least with respect to where a user should live, or vacation to, during retirement that will begin after a certain number of years.

In some implementations, generating the digital representation includes generating an XR representation. For example, an XR representation can be a VR representation, an AR representation and/or an MR representation. Generating the XR representation can include generating a virtual environment, generating a data model personalized for the user, creating a persona for the user, and/or creating a virtual avatar for the user within the virtual environment. Further details regarding generating the XR representation will be described in further detail below with reference to FIG. 6B. In some implementations, generating the digital representation includes generating a non-XR representation. Examples of non-XR representation include websites (e.g., 2D websites), audio representations, visual representations, audio-visual representations and/or textual representations.

At operation 620, processing logic provides the digital representation to the user. More specifically, the digital representation can be provided to the user via at least one channel accessible by the user. For example, a digital representation can be provided via at least one: a user interface of an application or website, an email, a text message, a push notification, a chatbot, etc. In some implementations, at least one optimization method can be used to optimize the digital representation for a channel to improve computational efficiency and/or user accessibility. For example, an image optimization method can be used to ensure that an image loads quickly and/or would be aesthetically pleasing to the user. In some implementations, the digital representation can be updated based on user feedback related to interactions within the virtual environment.

In some implementations, providing the digital representation to the user includes providing the user access to an XR representation accessible via at least one XR system. For example the at least one XR system can include at least one of a VR system, an AR system or an MR system. In some implementations, providing the digital representation to the user includes providing the user access to a non-XR representation via at least one non-XR system.

At operation 630, processing logic can convert the digital representation to a different digital representation. The conversion can be performed based on at least one of: user preference, user device capability, context of use, etc. The conversion can be performed using at least one ML-based conversion tool that can preserve content quality during the conversion. For example, a text-to-speech conversion model can be used to convert a text-based recommendation into an audio-based recommendation. As another example, a ML model can reduce the resolution of an image using a content-preserving image resolution downscaling method. In some implementations, converting the digital representation can include converting an XR representation to a non-XR representation. In some implementations, converting the digital representation can include converting a non-XR representation to an XR representation. Accordingly, implementations described herein can perform bidirectional conversion of digital representations across XR and non-XR modalities. In some implementations, a ML model includes a convolutional neural network (CNN).

For example, to convert an XR representation into a non-XR representation, a ML model can assesses, categorize, and distinguish elements within an XR environment of the XR representation. For each element of an XR environment, the ML model can perform classification, precise positioning, color-coded visualization, and/or labeling using image recognition. The initial stage employs these labels to formulate a concise and easily comprehensible summary. This summary serves as a preliminary assessment, facilitating accurate review in terms of measurements and realism. Subsequently, a validation or verification process is performed (e.g., manual and/or automated) to generate an XR environment description describing the XR elements of the XR environment. For example, the XR environment description can be generated using NLP, generative models, etc. After generating the enriched description, the next phase involves translating the XR environment description into formats compatible with non-XR systems.

In addition to generating digital representations, the conversion process described above can also maintain a collection of labels within a data repository. Additionally, through the application of ML graph techniques, it establishes intricate relationships (e.g., dependencies). For example, each time a new label is generated and subsequently validated, it becomes seamlessly integrated into the existing framework. That is, the interconnected network of labels and relationships ensures that whenever a label is employed, a chain reaction can be initiated. A relationship-driven verification mechanism can cross-reference newly introduced labels with the pre-existing ones. This correlation can be used to enhance the overall functionality and coherence of the label system.

For example, consider the scenario of a light fixture attached to the ceiling. In this case, the system would recognize the potential need for a complementary light switch. Similarly, when a garage door is identified, the system would intuitively anticipate the requirement for a corresponding garage door opener. This correlation process isn't solely focused on individual label functionality, and can extend to enriching the user experience. The overarching objective is twofold: first, to ensure that each label functions autonomously as a valuable artifact, and second, to elevate the user's experience by harmonizing a digital representation and a corresponding real-world scenario. This mechanism ensures not only accuracy but also a practical alignment with reality, fundamentally enhancing the user's engagement and interaction with the XR environment.

Figure 6B:
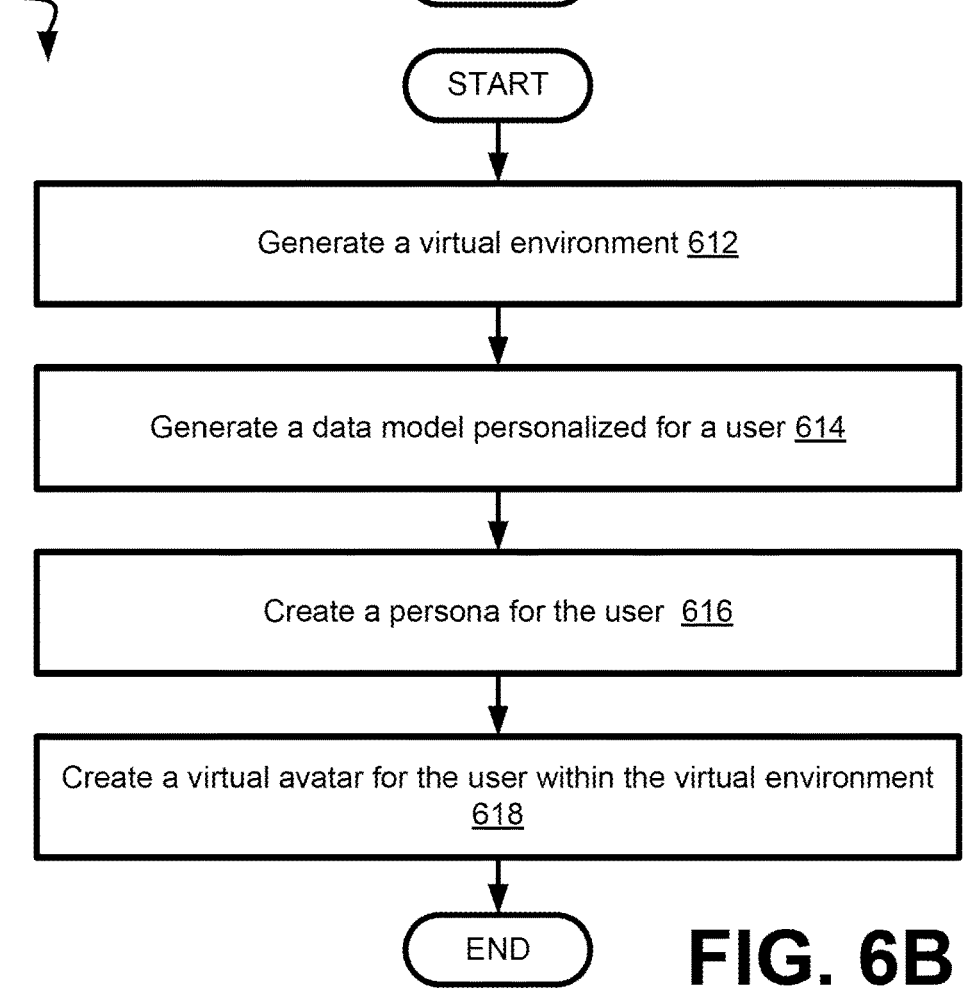

FIG. 6B is a flow diagram of an example method 610 to generate XR representations for personalized recommendations, in accordance with some implementations of the present disclosure. Method 610 can be performed by at least one processing device that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 610 is performed by one or more components of computing system 100 of FIG. 1A. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 612, processing logic generates a virtual environment. The virtual environment can be accessible to users via an XR system (e.g., a VR system, an AR system and/or an MR system). For example, generating the virtual environment can include generating a virtual world accessible to users via a VR system. The virtual environment can be interactive and customizable so that each user can experience a unique and personalized experience within the virtual environment. The virtual environment can be customized to accommodate users with disabilities.

In some implementations, the virtual environment includes a 3D space generated using at least one ML model. In some implementations, the virtual environment includes a 3D space generating using a procedural generation technique. A procedural generation technique can automatically generate content for a virtual environment based on a set of rules and/or methods. Examples of content include images, textures, levels, music, etc.

At operation 614, processing logic generates a data model personalized for a user. The data model can enable a comprehensive understanding of the user's behavior, needs and/or preferences within the virtual environment. The data model can be used to personalize the experience for the user, such as virtual experiences based on interactions with others (e.g., friends and family). The data model can be generated using ML techniques that can analyze the user's behavior in the virtual environment, including interactions with objects, other users, emotions, biometrics (e.g., eye tracking), etc. The data model can be updated in real-time or near real-time to enable automatic and/or continuous updates of the virtual environment (e.g., improvements to the virtual experience). In some implementations, a reinforcement model can be used to update the data model based on user interactions within the virtual environment.

At operation 616, processing logic creates a persona for the user. A persona is a representation of the user that can be determined from the user's behavior needs and/or preferences. The persona can be used to customize user experiences within the virtual environment. Various types of personas are contemplated. In some implementations, a psychographic segmentation model is used to create a persona. A psychographic segmentation model is a model that classifies a user in accordance with a set of psychological and/or behavioral attributes. One example of a psychographic segmentation model is the OCEAN model, which stands for the following personality dimensions: "Openness, Conscientiousness, Extraversion, Agreeableness, and Neuroticism." The OCEAN model can characterize the personality traits of a user across these five personality dimensions.

For example, in the context of retirement planning, different personas may face challenges such as balancing retirement savings with other financial goals or face challenges such as managing healthcare expenses and adjusting to a fixed income. Such personas can be used to track the progress of retirement savings accumulation and decumulation over time. This will help provide a more accurate representation of how retirement planning decisions impact retirement income and lifestyle.

For example, one type of persona is an intelligent accumulator persona. An intelligent accumulator persona represents a user who is focused on building their retirement savings and investment portfolio. This persona is more interested in learning about investment strategies and risk management and prefers interactive simulations and AI-powered tools to experiment with different investment scenarios. The personas can be developed with specific retirement savings goals in mind, and the accumulation of retirement savings can be a key part of their journey. For example, one intelligent accumulator persona can be a young professional who is just starting to save for retirement.

Another type of persona is an intelligent decumulator persona. An intelligent decumulator persona represents a user who is more interested in managing their retirement expenses and making their savings last. This persona is more interested in budgeting tool and financial planning advice that can help them manage their expenses and maximize their retirement income. Intelligent decumulator personas can be developed with specific withdrawal needs in mind, such as medical expenses or travel plans during retirement. Decumulation strategies will be integrated into the personas journeys to help them achieve their withdrawal goals without running out of money.

At operation 618, processing logic creates a virtual avatar for the user within the virtual environment. The virtual avatar, also referred to as a "digital twin," is a representation of the user within the virtual environment and thus enables the user to interact with the virtual environment. The virtual avatar can be created by mapping a set of attributes representing visual features of the user to a digital representation of the user. For example, the set of attributes can include physical attributes, such as height, weight, body shape, hair color, eye color, skin color, etc. The visual features can reflect the user's current attributes, or can correspond to predicted features for the user at some point in the future. The set of attributes can be automatically configured (e.g., based on image data and/or other data provided by the user) and/or manually configured by the user. In some implementations, a trained generative model is used to create the virtual avatar based on a user's real-world appearance and/or characteristics of the persona. In some implementations, the virtual avatar is used to visually represent the user's progress with respect to a personalized goal.

At least some visual features of the virtual avatar can be reconfigured or updated over time by updating the set of attributes (e.g., automatically updated or manually updated). For example, the virtual avatar can be updated in real-time or near real-time by automatically learning from user interactions made within the virtual environment. Additionally, the set of attributes of the digital representation can be adjusted in accordance with changes to user attributes, such as weight, body shape, hair color, etc.

In some implementations, a user can simulate various scenarios related to retirement within the virtual environment (e.g., investment scenarios, financial situations, retirement goals). As an illustrative example, a user named Jane may be looking for a new and unique way to experience retirement. She is interested in exploring new places, meeting new people, and participating in new experiences. A virtual world, persona and virtual avatar can be created for Jane to model her future retirement. Jane's virtual avatar can interact with objects and people within the virtual environment. Jane may also be able to participate in experiences that are personalized to her interests, such as exploring virtual recreations of her favorite destinations. Additionally, virtual avatars can be created to represent Jane's family and friends, enabling Jane to interact with them in the virtual world. Over time, Jane's virtual world, persona and/or virtual avatar can be updated by detecting changes to her real life, such as changing behaviors, needs and/or preferences. Accordingly, Jane's experience within the virtual environment can continuously evolve and improve, which can provide a more accurate illustration of her retirement experience.

As another illustrative example, a user named John wants to spend his retirement in a beach town with a close-knit community. John's virtual avatar can be created and placed within a virtual beach town, where he can interact with virtual objects, people, and emotions that simulate the real-world experience. John can also customize his experience by adjusting his personalization settings and preferences. The system can continually learn from John's interactions in the virtual environment, which can be used to adjust his virtual experience based on his behavior and preferences.

As yet another illustrative example, James wants to experience retirement with his family and friends. James can invite family and friends to participate in his virtual environment, enabling them to interact with each other in the virtual environment. The system can continually learn from John's interactions with his friends and family within the virtual world, allowing for a more personalized and engaging experience for all participants.

As yet another illustrative example, the virtual environment can be used to facilitate collaborative planning sessions between younger generations and other people (e.g., family members). These sessions can help younger generations learn from the experiences of their elders and gain a deeper understanding of the importance of retirement planning.

Figure 7:
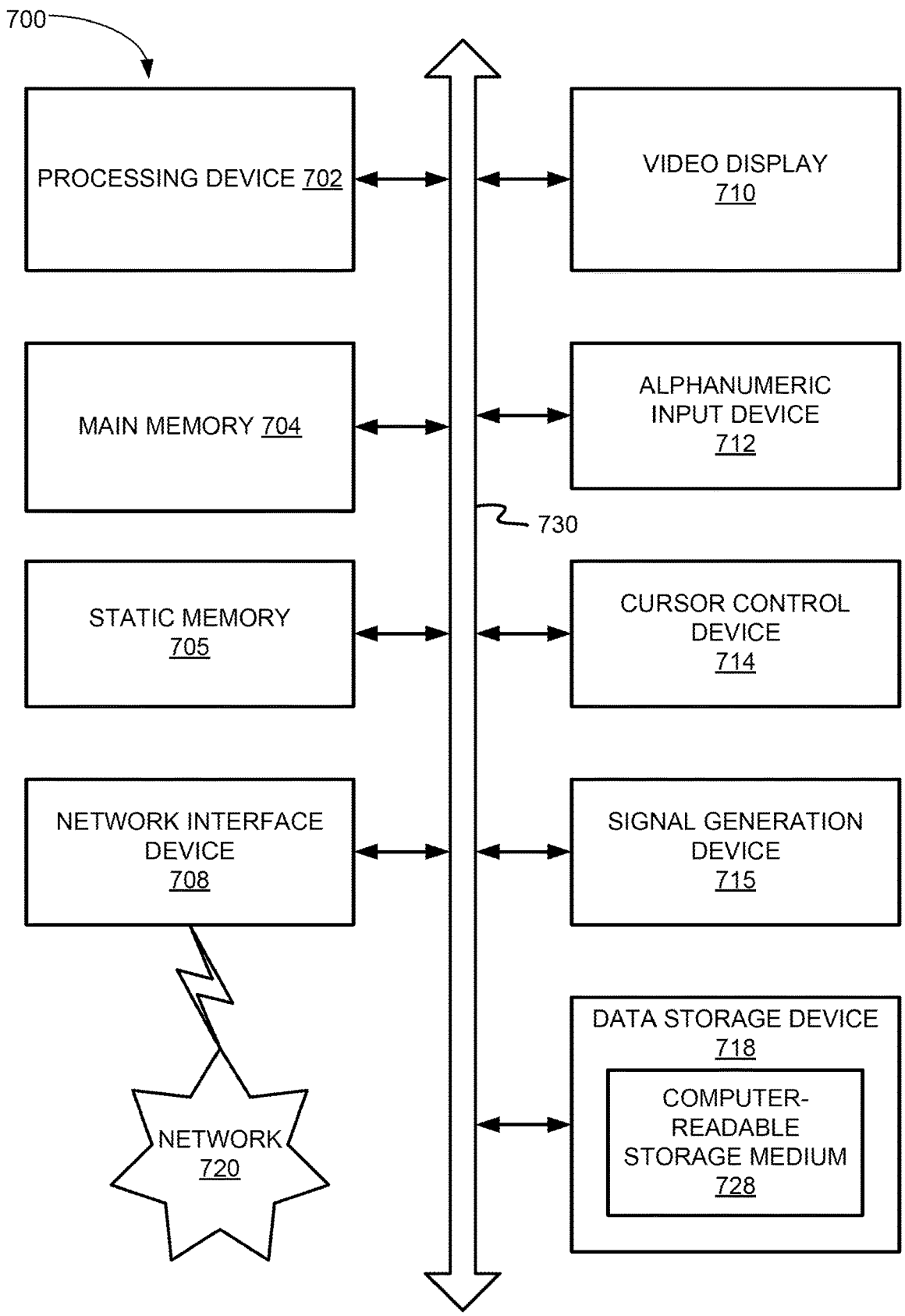
FIG. 7 is a block diagram of an example computer system in which implementations of the present disclosure may operate.

FIG. 7 illustrates a diagrammatic representation of a computer system 700, which may be employed for implementing the methods described herein. The computer system 700 may be connected to other computing devices in a LAN, an intranet, an extranet, and/or the Internet. The computer system 700 may operate in the capacity of a server machine in a client-server network environment. The computer system 700 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 700 may represent one or more servers of a computing system implementing methods 300-600.

The example computer system 700 may include a processing device 702, a main memory 704 (e.g., synchronous dynamic random access memory (DRAM), read-only memory (ROM)), and a static memory 705 (e.g., flash memory and a data storage device 718), which may communicate with each other via a bus 730.

The processing device 702 may be provided by one or more general-purpose processing devices such as a microprocessor, central processing unit, or the like. In an illustrative example, the processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also comprise one or more special-purpose processing devices such as an application specific integrated circuit (ASIC), a field programmable gate array (FPGA), a digital signal processor (DSP), a network processor, or the like. The processing device 702 may be configured to execute methods of managing computing systems, in accordance with one or more aspects of the present disclosure.

The computer system 700 may further include a network interface device 708, which may communicate with a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and/or an acoustic signal generation device 715 (e.g., a speaker). In some embodiments, video display unit 710, alphanumeric input device 712, and cursor control device 714 may be combined into a single component or device (e.g., an LCD touch screen).

The data storage device 718 may include a computer-readable storage medium 728 on which may be stored one or more sets of instructions (e.g., instructions of the methods of automated review of communications, in accordance with one or more aspects of the present disclosure) implementing any one or more of the methods or functions described herein. The instructions may also reside, completely or at least partially, within main memory 704 and/or within processing device 702 during execution thereof by computer system 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" shall be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that causes the machine to perform the methods described herein. The term "computer-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:
    memory; and
    at least one processing device, operatively coupled to the memory, to perform operations comprising:
        obtaining user data associated with a user;
        generating, using at least one machine learning (ML) model processing the user data, a personalized plan related to a future of the user and a virtual environment corresponding to the personalized plan, wherein the virtual environment is associated with an extended reality (XR) representation accessible to the user via an XR system; and
        creating, based on the user data, a virtual avatar for the user reflecting a representation of the user within the virtual environment, wherein the virtual avatar corresponds to a set of attributes representing visual features of the user.

2. The system of claim 1, wherein the XR system comprises at least one of: a virtual reality (VR) system, an augmented reality (AR) system, or a mixed reality (MR) system.

3. The system of claim 1, wherein the operations further comprise converting the XR representation into a non-XR representation accessible to the user via a non-XR system, and wherein the non-XR representation is one of: an audio representation, a visual representation, an audiovisual representation, or a textual representation.

4. The system of claim 1, wherein the operations further comprise:
    receiving feedback data corresponding to the user; and
    updating, based on the feedback data, the XR representation.

5. The system of claim 1, wherein the operations further comprise receiving a request to generate at least one of the personalized plan or the XR representation.

6. The system of claim 5, wherein the request is received via a digital assistant.

7. The system of claim 5, wherein the operations further comprise:
    causing the XR representation to be sent to the user.

8. A method comprising:
    obtaining, by at least one processing device, user data associated with a user;
    generating, by the at least one processing device using at least one machine learning (ML) model processing the user data, a personalized plan related to a future of the user and a virtual environment corresponding to the personalized plan, wherein the virtual environment is associated with an extended reality (XR) representation accessible to the user via an XR system; and
    creating, by the at least one processing device based on the user data, a virtual avatar for the user reflecting a representation of the user within the virtual environment, wherein the virtual avatar corresponds to a set of attributes representing visual features of the user.

9. The method of claim 8, wherein the XR system comprises at least one of: a virtual reality (VR) system, an augmented reality (AR) system, or a mixed reality (MR) system.

10. The method of claim 8, further comprising converting, by the at least one processing device, the XR representation into a non-XR representation accessible to the user via a non-XR system, wherein the non-XR representation is one of: an audio representation, a visual representation, an audiovisual representation, or a textual representation.

11. The method of claim 8, further comprising:
receiving, by the at least one processing device, feedback data corresponding to the user; and
updating, by the at least one processing device based on the feedback data, the XR representation.

12. The method of claim 8, further comprising receiving, by the at least one processing device, a request to generate at least one of the personalized plan or the XR representation.

13. The method of claim 12, wherein the request is received via a digital assistant.

14. The method of claim 8, further comprising:
causing, by the at least one processing device, the XR representation to be sent to the user.

15. A non-transitory computer-readable storage medium having instructions stored thereon that, when executed by a processing device, cause the processing device to perform operations comprising:
obtaining user data associated with a user;
generating, using at least one machine learning (ML) model processing the user data, a personalized plan related to a future of the user and a virtual environment corresponding to the personalized plan, wherein the virtual environment is associated with an extended reality (XR) representation accessible to the user via an XR system; and
creating, based on the user data, a virtual avatar for the user reflecting a representation of the user within the virtual environment, wherein the virtual avatar corresponds to a set of attributes representing visual features of the user.

16. The non-transitory computer-readable storage medium of claim 15, wherein the XR system comprises at least one of: a virtual reality (VR) system, an augmented reality (AR) system, or a mixed reality (MR) system.

17. The non-transitory computer-readable storage medium of claim 15, wherein the operations further comprise converting the XR representation into a non-XR representation accessible to the user via a non-XR system, and wherein the non-XR representation is one of: an audio representation, a visual representation, an audiovisual representation, or a textual representation.

18. The non-transitory computer-readable storage medium of claim 15, wherein the operations further comprise:
receiving feedback data corresponding to the user; and
updating, based on the feedback data, the XR representation.

19. The non-transitory computer-readable storage medium of claim 15, wherein the operations further comprise:
receiving a request to generate at least one of the personalized plan or the XR representation; and
causing the XR representation to be sent to the user.

20. The non-transitory computer-readable storage medium of claim 19, wherein the request is received via a digital assistant.

* * * * *